3,829,477
PROCESS FOR THE PREPARATION OF ACID
CHLORIDES AND THEIR ACIDS
Jean-Claude Strini, Saint Auban, France, assignor to
Produits Chimiques Pechiney-Saint-Gobain, Neuilly-sur-Seine, France
No Drawing. Filed Nov. 23, 1970, Ser. No. 92,281
Claims priority, application France, Dec. 4, 1969,
6941890
Int. Cl. C07c 51/58
U.S. Cl. 260—539 R 16 Claims

ABSTRACT OF THE DISCLOSURE

A process for the preparation of acid chlorides and their corresponding acids by reaction of an aliphatic hydrocarbon having the formula $CCl_2=CXY$ and an organic acid having the formula CHWZ—COOH at a temperature within the range of 100° to 250° C., in the presence of ferric chloride and under hydrochloric acid pressure in which W, X, Y and Z are hydrogen, chlorine, a $C_1$ to $C_2$ alkyl group, or a chlorinated $C_1$ to $C_2$ alkyl group other than trichloromethyl.

---

This invention relates to the preparation of acid chlorides and their corresponding acids by the action of chlorinated aliphatic hydrocarbons containing the grouping $CCl_2=C$ on organic acids.

It is known to prepare organic acid chlorides from corresponding acids in the presence of compounds such as phosgene, oxalyl chloride, phosphorus pentachloride, phosphorus trichloride or thionyl chloride. The compounds used to convert the initial acid to its chloride by such methods yield by-products of substantial amounts, at least 30 molar percent based on initial acid, which by-products are not capable of utilization in the reaction for preparing acid chlorides. Furthermore, by such methods, a maximum of one mole of acid chloride per mole of acid used is obtained.

It is an object of this invention to provide a process for the preparation of acid chlorides and/or their corresponding acids which is not subject to the disadvantages of the processes heretofore described, in which the product is secured in high yields with regard to the initial aliphatic chlorinated hydrocarbon, and in which about 2 moles of acid chloride are obtained per mole of initial organic acid used.

In accordance with the practice of this invention, chlorinated aliphatic hydrocarbon, corresponding to the formula $CCl_2=CXY$ is reacted with an organic acid having the formula CHXY—COOH, at a temperature within the range of 100° to 250° C., in the presence of ferric chloride and hydrochloric acid under pressure. The reaction may be represented by the equation

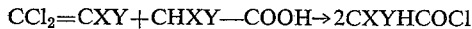
$CCl_2=CXY + CHXY\text{—COOH} \rightarrow 2CXYHCOCl$ in which X and Y represent hydrogen, chlorine, a $C_1$ to $C_2$ alkyl group, a chlorinated $C_1$ to $C_2$ alkyl group other than trichloromethyl, and where X and Y do not simultaneously represent chlorine.

The ferric chloride is employed in the reaction medium in an amount generally within the range of 0.1% to 20% by weight, based upon the organic acid used, and preferably in an amount within the range of 1% to 10% by weight.

The hydrochloric acid is employed under pressure within the range of 2 to 60 absolute bars and preferably within the range of 8 to 40 absolute bars.

In accordance with the practice of this invention, the molar ratio of chlorinated aliphatic hydrocarbon/organic acid is within the range of 0.1/1 to 3/1 and preferably within the range of 1/1 to 1.5/1.

For best practice, the reaction temperature is selected to be within the range of 110° to 170° C.

The reaction time depends somewhat on the reaction temperature as well as on the initial chlorinated aliphatic hydrocarbon. Generally, the reaction lasts from 2 to 6 hours with conversion rates of the initial chlorinated aliphatic hydrocarbon of at least 80%. Reaction time varies inversely with reaction temperature with the reaction time decreasing with increase in reaction temperature.

Compounds corresponding to the formula $CCl_2=CXY$, which may be used in the practice of this invention, are represented by vinylidene chloride, trichloroethylene, 1,1-dichloropropene and 1,1,2- and 1,1,3-trichloropropenes.

Examples of organic acids which may be used, having the general formula CHXY—COOH, are acetic, chloracetic, propionic, chloropropionic acids, and preferably alphachloropropionic acid.

The chlorinated aliphatic hydrocarbon and the organic acid can be reacted by bringing the reagents into contact by various means. Contact can be achieved by simultaneous introduction of both reagents into a reaction zone. In the alternative, the chlorinated aliphatic hydrocarbon can be introduced first into a reaction zone and then the acid. According to an alternate method, the acid can be introduced first and then the chlorinated aliphatic hydrocarbon. In carrying out the reaction, use can be made of a reaction medium containing an inert solvent under the operating conditions of the reaction. As the solvent, use can be made, for example, of symmetrical tetrachloroethane, hexachlorobutadiene, dichloropropane or nitrobenzene.

When it is desired to prepare either an acid—acid chloride mixture, or acid alone, an amount of water sufficient to convert the acid chloride at least partially into the acid can be introduced either upon completion of the reaction or progressively as the reaction proceeds.

Although the invention is described for the reaction

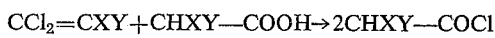
$CCl_2=CXY + CHXY\text{—COOH} \rightarrow 2CHXY\text{—COCl}$ it is possible to transpose the described operating conditions to achieve the following reaction:
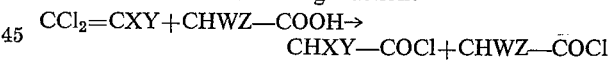
$CCl_2=CXY + CHWZ\text{—COOH} \rightarrow$
$CHXY\text{—COCl} + CHWZ\text{—COCl}$ in which W and Z have the same significance previously given to X and Y, and in which at least one of the substituents X, Y, W and Z is different from the others. In such instance, there are obtained two acid chlorides which may be separated by conventional means, such as by distillation, eventually under reduced pressure. In the instance where both XY groups are identical to both WZ groups, there will be obtained only a single type of acid chloride, as previously stated.

This reaction can be still more generalized in accordance with the following equation:

$Cl_2=CXY + RCOOH \rightarrow CHXY\text{—COCl} + R\text{—COCl}$ in which R represents a $C_1$ to $C_{18}$, and preferably a $C_1$ to $C_{12}$ alkyl or chlorinated alkyl group, a $C_6$ to $C_{10}$ aryl or chlorinated aryl group, a $C_7$ to $C_{12}$ arylalkyl or chlorinated arylalkyl group, a $C_7$ to $C_{12}$ alkaryl or chlorinated alkaryl group, a $C_5$ to $C_{12}$ cycloaliphatic or chlorinated cycloaliphatic group, and in which X and Y have the same significance as that previously given.

The following examples are given by way of illustration, but not by way of limitation, of the practice of the invention:

Example 1

Into an autoclave, having a capacity of 1 liter and equipped with a thermo-regulator system, there are introduced under agitation 197 g. (1.5 moles) of trichloroethylene, 94.5 g. (1 mole) of monochloroacetic acid and 2.8 g. of $FeCl_3$ (3% by weight based upon the monochloroacetic acid). The temperature is raised to 150° C. and the pressure rises to 5.8 absolute bars. After two hours, no reaction is noticed between the trichloroethylene and monochloroacetic acid. The hydrochloric acid is introduced into the autoclave until the pressure in the autoclave rises by 20 absolute bars and the mixture is maintained at 150° C. for 3 hours. The autoclave is cooled and degassed. The contents are distilled under pressure of 10 mm. mercury. There are collected 234.3 g. of a mixture analyzed to contain 80.6 g. (0.71 mole) of monochloroacetyl chloride, about 132.2 g. (1 mole) of trichloroethylene and about 21.5 g. (0.13 mole) of 1,1,1,2-tetrachloroethane. In the autoclave, there are recovered 64.6 g. of a product containing 60.8 g. (0.64 mole) of monochloroacetic acid, 2.8 g. of $FeCl_3$ and 1 g. of heavy residue.

The molar conversion rate of the trichloroethylene is calculated to be 33.3%. The yield of monochloroacetyl chloride, based on the converted trichloroethylene is 71.4 molar percent. When it is considered that the main by-product is 1,1,1,2-tetrachloroethane, which can be converted back to the trichloroethylene by dehydrochlorination, for instance, as by the process of the U.S. application Ser. No. 11,118, filed Feb. 13, 1970, the express yield with respect to the reacted trichloroethylene, including the reconversion of 1,1,1,2-tetrachloroethane, is then 98 molar percent.

By way of comparison, the conditions of Example 1 were repeated, except that the temperature is raised to 160° C. and hydrochloric acid is introduced in amount to increase the pressure only by 5 absolute bars. After 3 hours at 160° C. and distillation, there are collected 298.4 g. of a product analyzed to contain 184.7 g. (1.4 moles) of trichloroethylene, 3.4 g. (0.02 mole) of 1,1,1,2-tetrachloroethane and 11 g. (0.097 mole) of monochloroacetyl chloride. In the autoclave, there are recovered 5.2 g. (0.03 mole) of 1,1,1,2-tetrachloroethane, 89.6 g. of monochloroacetic acid and 9.5 g. of ferric chloride. The molar conversion rate of the trichloroethylene is only 6.5%.

Example 2

The conditions of Example 1 are repeated except that the amount of ferric chloride is 9.5 g., or 10% by weight based upon the monochloroacetic acid.

After 3 hours of reaction time, there are obtained 284.7 g. of a mixture analyzed to contain 244 g. (1.9 moles) of monochloroacetyl chloride, 50.7 g. (0.38 mole) of trichloroethylene, 17 g. (0.10 mole) of 1,1,1,2-tetrachloroethane. In the autoclave, there are recovered 11.5 g. of a product containing 9.5 g. of $FeCl_3$. The molar conversion rate of the trichloroethylene is 76.7%. The yield of monochloroacetyl chloride is 86.2 molar percent, but with regard to the trichloroethylene reacted when the 1,1,1,2-tetrachloroethane is brought back, the yield rises to 97.8 molar percent.

Example 3

Into an autoclave having a capacity of 1 liter and equipped with a thermo-regulator system, there are introduced under agitation 60 g. (1 mole) of acetic acid, 106.7 g. (1.1 mole) of 1,1-dichloroethylene and 3 g. of $FeCl_3$ (5% by weight based upon the acetic acid introduced). Afterwards there is introduced hydrochloric acid sufficient to reach 8 absolute bars of pressure. Upon heating at 125° C. for 2 hours, the pressure rises to 23 absolute bars. The autoclave is then cooled and the hydrochloric acid is slowly degassed during cooling in order to recover unreacted vinylidene chloride. In this way 33 g. of vinylidene chloride (0.34 mole) is recovered.

The remaining reaction product is then rapidly decanted into a 250 ml. balloon-flask or bulk and distilled under atmospheric pressure. There is collected a fraction, distilling up to 51° C., of 102.9 g. analyzed to contain 91.5 g. (1.16 moles) of acetyl chloride and about 11.4 g. (0.12 mole) of vinylidene chloride, and then a fraction of 25 g. which is pure acetic acid is removed by distillation. On the bottom of the flask, there remains 8.5 g. of a tarry product containing 3 g. of $FeCl_3$.

The molar conversion rate of the vinylidene chloride is 58.5% and the molar yield of acetyl chloride, with regard to the reacted vinylidene chloride, is 90.7%.

By way of comparison, Example 3 was repeated but with heating at 80° C. instead of 125° C. Only traces of acetyl chloride are recovered.

It will be understood that changes may be made in the details of formulation and operation without departing from the spirit of the invention, especially as defined in the following claims.

I claim:

1. A process for the preparation of acid chlorides and their corresponding acids comprising reacting a chlorinated aliphatic hydrocarbon having the formula

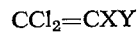

$$CCl_2=CXY$$

and an organic acid having the formula CHWZ—COOH in which W, X, Y and Z are selected from the group consisting of hydrogen, chlorine, a $C_1$ to $C_2$ alkyl group, a chlorinated $C_1$ to $C_2$ alkyl group other than trichloromethyl and in which X and Y do not simultaneously represent chlorine, and in which the reaction is carried out at a temperature within the range of 100° to 250° C. in the presence of ferric chloride and hydrochloric acid under a pressure of 2 to 60 bars.

2. The process as claimed in Claim 1 in which both the X and Y groups and the W and Z groups are the same.

3. The process as claimed in Claim 1 in which the ferric chloride is present in an amount within the range of 0.1% to 20% by weight based upon the organic acid.

4. The process as claimed in Claim 1 in which the ferric chloride is present in an amount within the range of 1% to 10% by weight based upon the organic acid.

5. The process as claimed in Claim 1 in which the chlorinated aliphatic hydrocarbon to organic acid are present in the molar ratio of 0.1 to 3 of the chlorinated aliphatic hydrocarbon of 1 of the organic acid.

6. The process as claimed in Claim 1 in which the molar ratio of chlorinated aliphatic hydrocarbon/organic acid is from 1/1 to 1.5/1.

7. The process as claimed in Claim 1 which includes a solvent in the reaction medium selected from the group consisting of symmetrical tetrachloroethane, hexachlorobutadiene, dichloropropane and nitrobenzene.

8. The process as claimed in Claim 1 in which the hydrochloric acid pressure is within the range of 8 to 40 absolute bars.

9. The process as claimed in Claim 1 in which the reaction temperature is within the range of 110° to 170° C.

10. The process as claimed in Claim 1 in which the reaction is carried out for a time within the range of 2 to 6 hours.

11. The process as claimed in Claim 1 in which the chlorinated aliphatic hydrocarbon is selected from the group consisting of vinylidene chloride, trichloroethylene, 1,1-dichloropropene and 1,1,2- and 1,1,3-trichloropropenes.

12. The process as claimed in Claim 1 in which the organic acid is selected from the group consisting of acetic acid, chloroacetic acid, propionic acid, chloropropionic acid and alphachloropropionic acid.

13. The process as claimed in Claim 1 in which the reaction is carried out by bringing the chlorinated aliphatic hydrocarbon into contact with the organic acid under the conditions described in Claim 1.

14. The process as claimed in claim 1 which includes the step of introducing water in an amount sufficient to convert the acid chloride formed in the reaction at least partially to the corresponding acid.

15. A process for the preparation of acid chlorides and their corresponding acids comprising reacting a chlorinated hydrocarbon selected from the group consisting of vinylidene chloride and trichloroethylene and an organic acid having the formula CHWZ—COOH in which W and Z are each selected from the group consisting of hydrogen, chlorine, a $C_1$ to $C_2$ alkyl group and a chlorinated $C_1$ to $C_2$ alkyl group other than trichloromethyl at a temperature within the range of 100° to 250° C. in the presence of ferric chloride and hydrochloric acid under a pressure of 2 to 60 bars.

16. A process as claimed in claim 15 in which the acid is selected from the group consisting of acetic acid, chloroacetic acid, propionic acid and α-chloropropionic acid.

References Cited
UNITED STATES PATENTS

| | | | |
|---|---|---|---|
| 3,449,416 | 6/1969 | Brotherton | 260—544 Y |
| 1,304,108 | 5/1919 | Simon et al. | 260—544 Y |
| 1,921,767 | 8/1933 | Mills | 260—544 Y |
| 1,965,556 | 7/1934 | Mills | 260—544 Y |
| 3,234,276 | 2/1966 | Renkoff et al. | 260—544 Y |
| 3,261,864 | 7/1966 | Fink | 260—544 Y |

LORRAINE A. WEINBERGER, Primary Examiner

R. D. KELLY, Assistant Examiner

U.S. Cl. X.R.

260—539 A, 540, 541, 544 Y